Dec. 12, 1967  A. J. GIGER  3,357,188
THRUST REVERSING APPARATUS FOR ROCKET MOTORS
Filed March 15, 1966  2 Sheets-Sheet 1

INVENTOR.
ANDREW J. GIGER
BY Edwin D. Grant

ATTORNEY

United States Patent Office 3,357,188
Patented Dec. 12, 1967

3,357,188
THRUST REVERSING APPARATUS FOR ROCKET MOTORS
Andrew J. Giger, Los Alamos, N. Mex., assignor to Thiokol Chemical Corporation, Bristol, Pa., a corporation of Delaware
Filed Mar. 15, 1966, Ser. No. 534,330
4 Claims. (Cl. 60—254)

This invention relates to rocket motors and more particularly to apparatus for venting the casing of a rocket motor so that thrust producing gases escape therefrom in a direction essentially opposite to their normal direction of discharge.

In the use of large rocket motors for space missions and the like, a means of reversing the direction of flow of thrust gases generated by such rocket motors is of great importance in the successful execution of certain flight programs. However, other space missions do not require such thrust reversal. From the standpoint of convenience and versatility, it would therefore be an advantage to have a thrust reversing means in the form of a casing segment that could easily be added to a rocket motor if thrust reversal is desired.

The present invention provides an uncomplicated yet effective apparatus that can readily be joined to the casing of a rocket motor and subsequently utilized to vent said casing to thereby permit thrust gases to escape in a forward direction relative thereto, thereby terminating or decelerating the forward motion of said rocket motor. Briefly described, a preferred embodiment of this invention comprises a rocket motor casing segment having a plurality of longitudinally extending support members, a plurality of circumferentially extending vanes fixedly mounted on said support members and projecting outwardly and forwardly therefrom, a plurality of covers removably mounted on said support members and surrounding said vanes, and means for removing said covers at a selected time.

It is accordingly an object of this invention to provide means for venting thrust gases from the casing of a rocket motor in a direction essentially opposite the normal direction of discharge of said thrust gases from the thrust nozzle or nozzles of said rocket motor.

Another object of this invention is to provide venting means of the type described that can be conveniently added to the casing of a rocket motor without impairing its structural rigidity.

Figure 1:
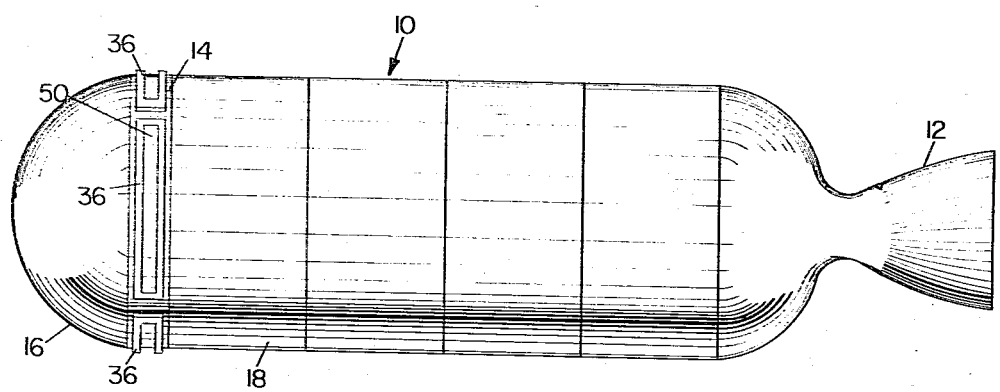
Figure 3:
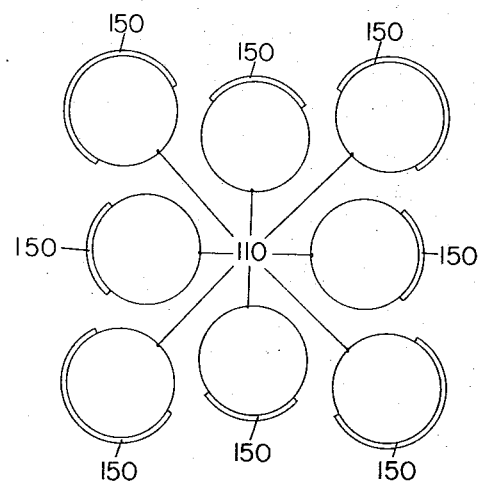
Figure 2:
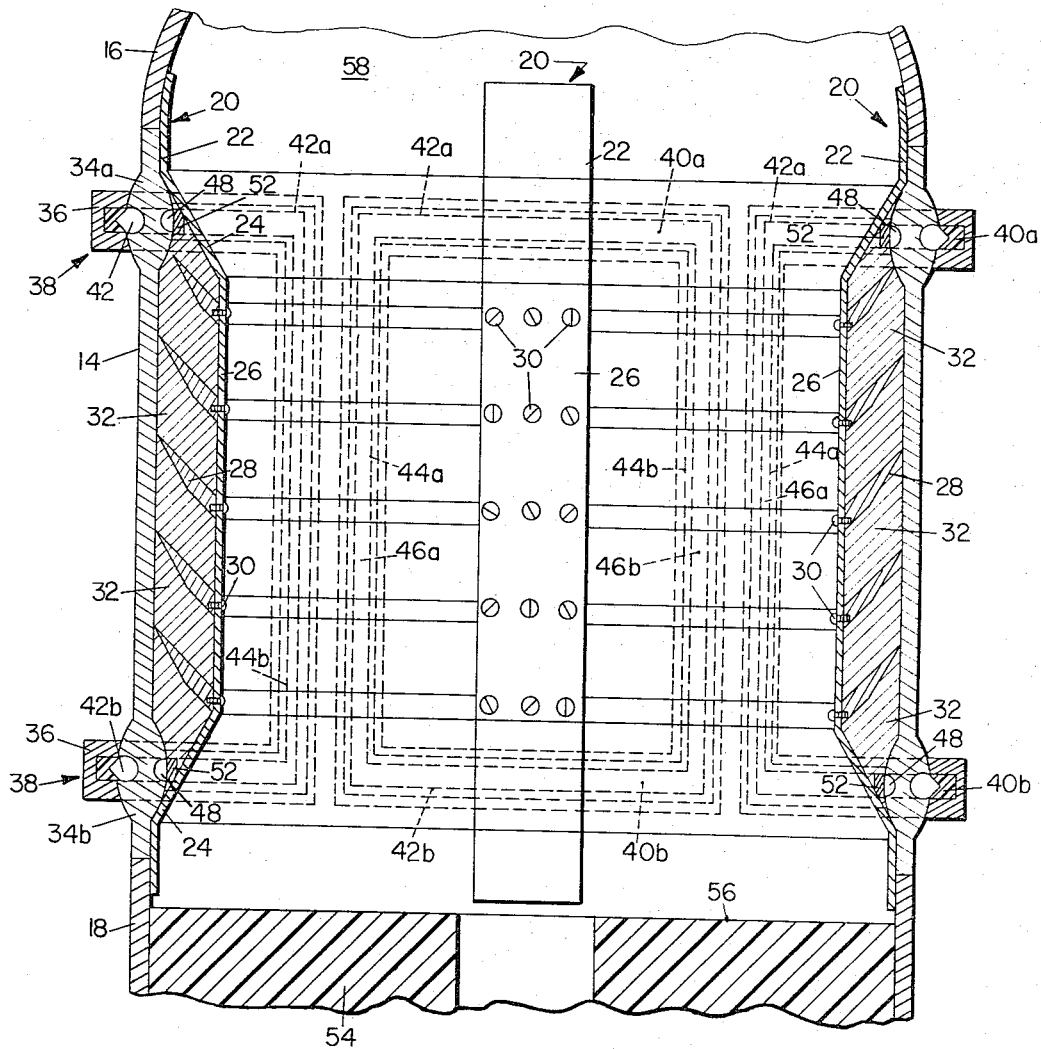

The above and other objects of the invention will be more clearly understood by consideration of the following description of a preferred embodiment thereof, in which reference is made to the accompanying drawings, wherein:

FIGURE 1 is a pictorial view of a rocket motor in which said embodiment is incorporated;
FIGURE 2 is a sectional view taken along the longitudinal axis of the rocket motor of FIGURE 1 at the point thereon where said embodiment is located; and
FIGURE 3 is a cross-sectional view of a cluster of rocket motors, illustrating an advantageous means of utilizing the invention therewith.

Throughout the specification and drawings the same reference numbers designate the same parts.

In FIGURE 1 reference number 10 generally designates a rocket motor having a thrust nozzle 12 fixedly mounted on the aft end thereof. As illustrated in the drawing, the casing of rocket motor 10 is segmented, i.e., it is formed of a plurality of cylindrical sections the ends of which are joined together by suitable means. More particularly, the casing of rocket motor 10 comprises a relatively narrow forward section 14 disposed between the forward end closure 16 and a second section 18 thereof. Generally designated in FIGURE 2 by reference number 20 are three of a plurality of support members longitudinally disposed within section 14 and spaced apart circumferentially thereof. The end portions 22 of support member 20 are fixedly connected by suitable means, such as welds, screws or rivets (not shown), to the end portions of the wall of section 14 and to the walls of forward end closure 16 and section 18 respectively, each of said support members having two inwardly projectig portions 24 joined to respective ones of said end portions 22, and each of said support members also having an intermediate portion 26 that is disposed parallel to the wall of section 14. Thus the support members 20 are fixedly connected to the casing of rocket motor 10 at longitudinally spaced points thereon and formed so that they are spaced inwardly from said casing between said points.

Five annular vanes 28 are disposed between the casing of rocket motor 10 (more particularly, the wall of section 14 thereof) and support members 20 and spaced apart longitudinally thereof, said vanes being fixedly attached to said support members by screws 30 and inclined in the direction of forward end closure 16. Disposed between the wall of section 14 and support members 20 and around vanes 28 is a thermal and shock insulating material 32, such as an asbestos filled epoxy resin, the inner surface of said material being even with the inner surfaces of said support members and the outer surface thereof abutting the inner surface of the wall of said section 14.

The wall of section 14 is formed with a circumferentially extending portion 34a, 34b of increased thickness adjacent each end thereof, and more particularly, said portions 34a, 34b extend around section 14 adjacent the forward and rearmost of vanes 28 respectively. In FIGURE 1 can be seen three of the housings 36 of four explosive charges, generally designated by reference number 38 in FIGURE 2, which are evenly spaced around section 14 of the casing of rocket motor 10. Each explosive charge 38 includes a pair of circumferentially extending segments 40a, 40b respectively aligned with a groove 42a, 42b formed in the outer surface of portions 34a, 34b of section 14 respectively and coextensive with said segments. Each explosive charge also includes a pair of longitudinally extending segments 44a, 44b (outlined in FIGURE 2 by broken lines) respectively joined to the ends of said circumferentially extending segments 40a, 40b thereof, said segments 44a, 44b also being aligned with a pair of grooves 46a, 46b (illustrated in FIGURE 2 by the broken lines that outline segments 44a, 44b) formed in the wall of section 14 and extending longitudinally thereof between the ends of respective ones of the grooves 42a, 42b. The portions of the wall of section 14 in which grooves 46a, 46b are formed also have an increased thickness, which, to simplify the drawings, is not illustrated. Formed in the inner surface of section 14 opposite each of the grooves 42a, 42b, 46a, 46b is a coextensive groove, four of which can be seen in FIGURE 2 and which, to simplify the reference numbers employed in this description, are each designated by reference number 48. Thus section 14 of the casing of rocket motor 10 contains four rectangular panels 50 (see FIGURE 1) the edge of each of which is defined by a continuous groove formed in both the inner and outer surface of the wall of said section and lying beneath one of the explosive charge housings 36. A baffle 52 abuts the inner surface of section 14 adjacent the two circumferentially extending and two longitudinally extending portions of each of the four grooves 48. Since these baffles serve to protect support members 20 when explosive charges 38 are detonated, they are preferably fabricated of high-strength steel.

It will be recognized that the structural components of the above-described embodiment of the invention can be formed of many different metals, and that explosive charges 38 and thermal and shock insulating material 32 can also be made of conventional materials that are well-known to persons skilled in the art of rocket motors.

In the preferred embodiment of the invention, rocket motor 10 is provided with a centrally perforated solid propellant charge 54 the forward end surface 56 of which is spaced a short distance from the aft end of section 14. When this charge is ignited, the combustion gases thereof pressurize the chamber 58 formed by section 14 and forward end closure 16 and also pass through thrust nozzle 12 to propel rocket motor 10 on its mission. If it is subsequently desired to terminate the thrust of rocket motor 10 while charge 52 is still burning, the explosive charges 38 can readily be detonated by conventional means, such as electrically-actuated squibs (not shown), to thereby rupture the thin-wall portions of the wall of section 14 between the outer grooves 42a, 42b, 46a, 46b and inner grooves 48, separating the panels 50 defined by these grooves from the area of said wall which surrounds said panels. The thermal and shock insulating material 32 is then removed from the spaces between vanes 28 by the high-temperature, high-pressure gases within chamber 58, and thereafter the escape of these gases in a forward direction through said vanes rapidly decelerates rocket motor 10. A desirable feature of the described perferred embodiment of the invention is that the panels 50 can be blown off separately to achieve various degrees of thrust termination as desired. It will also be recognized that the disclosed arrangement of section 14 makes it possible to add a thrust reversing means to the casing of a rocket motor with great convenience and without impairing the structural rigidity of said casing, either before or after thrust reversal is effected.

FIGURE 3 illustrates the application of the invention to a propulsion system comprising a plurality of rocket motors 110. It will be readily understood that components of the type illustrated in FIGURES 1 and 2 can be incorporated in the casing of each of the rocket motors 110. When the invention is utilized with a cluster of rocket motors, however, it is preferable to extend each of the removable panels 150 only around the outwardly disposed portion of the casing of which it forms a part.

Obviously many modifications and variations of the present invention are possible in the light of the above disclosure. It is therefore to be understood that, within the scope of the appended claims, the invention may be practiced otherwise than specifically described.

What is claimed is:
1. In a rocket motor, the combination comprising:
   a tubular casing;
   a plurality of support members longitudinally disposed within said casing and spaced apart circumferentially thereof, said support members being fixedly connected to said casing at longitudinally spaced points thereon and formed so that they are spaced inwardly from said casing between said points;
   a plurality of annular vanes disposed between said casing and said support members and spaced apart longitudinally thereof, said vanes being fixedly attached to said support members and inclined in a forward direction relative to said casing; and
   separating means mounted on said casing for removing at least a portion of the wall thereof adjacent said vanes at a selected time.

2. The combination defined in claim 1 wherein:
   said separating means comprises a plurality of explosive charges evenly spaced around said casing, each of said charges including a pair of circumferentially extending segments respectively disposed adjacent the forward and rearmost of said vanes and a pair of longitudinally extending segments respectively joined to the ends of said circumferentially extending segments; and
   a plurality of continuous grooves each formed in the wall of said casing adjacent the segments of a respective one of said charges.

3. The combination defined in claim 2 including a plurality of baffle each abutting the inner surface of said casing adjacent a respective one of said grooves.

4. The combination defined in claim 3 including thermal and shock insulating material disposed between said casing and said support members and around said vanes.

References Cited
UNITED STATES PATENTS

| | | | |
|---|---|---|---|
| 2,850,976 | 9/1958 | Seifert | 60—229 |
| 3,038,303 | 6/1962 | Gose | 60—229 |
| 3,177,655 | 4/1965 | White | 60—254 |
| 3,221,495 | 12/1965 | Tweet | 60—229 |

CARLTON R. CROYLE, *Primary Examiner.*